Patented Mar. 13, 1923.

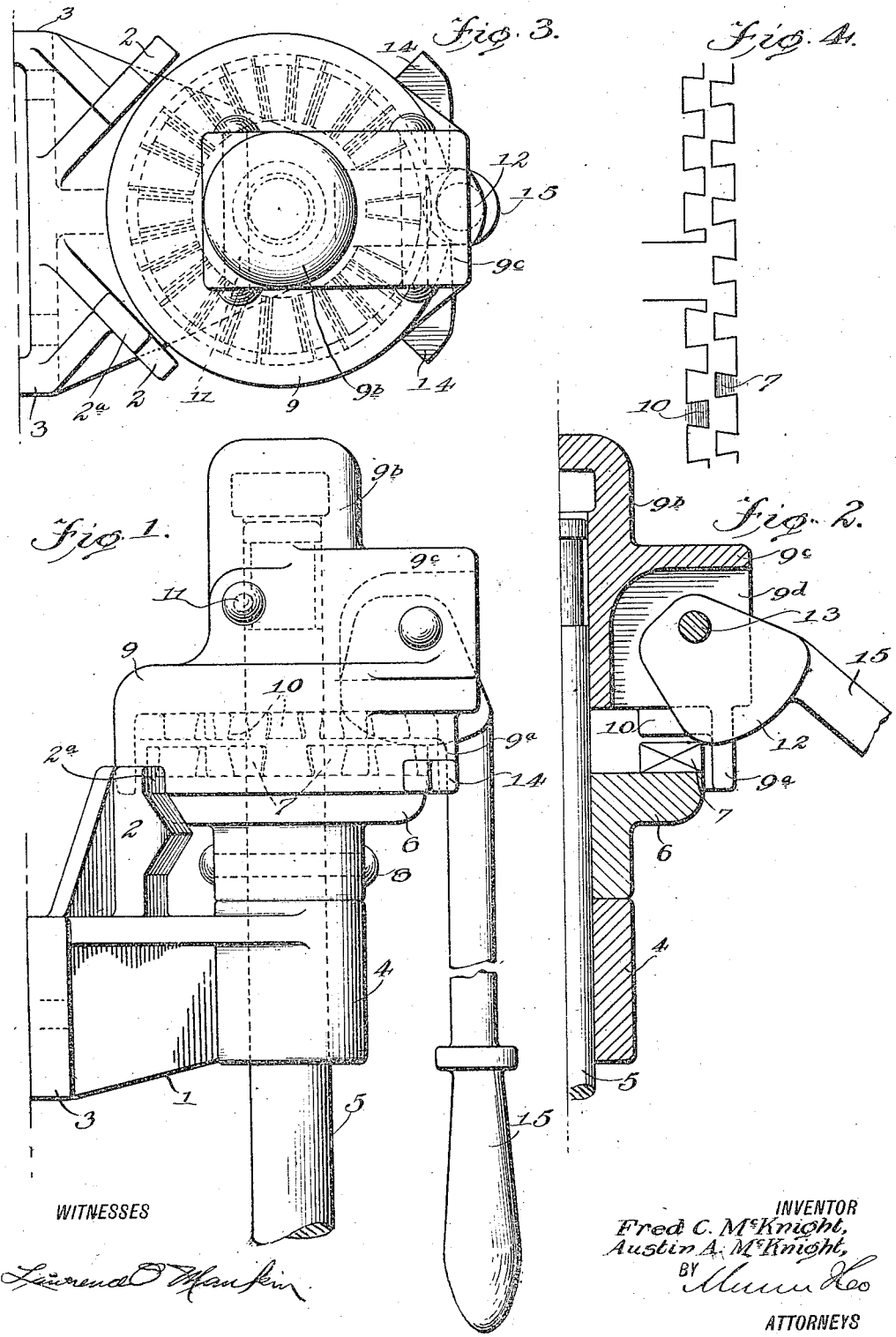

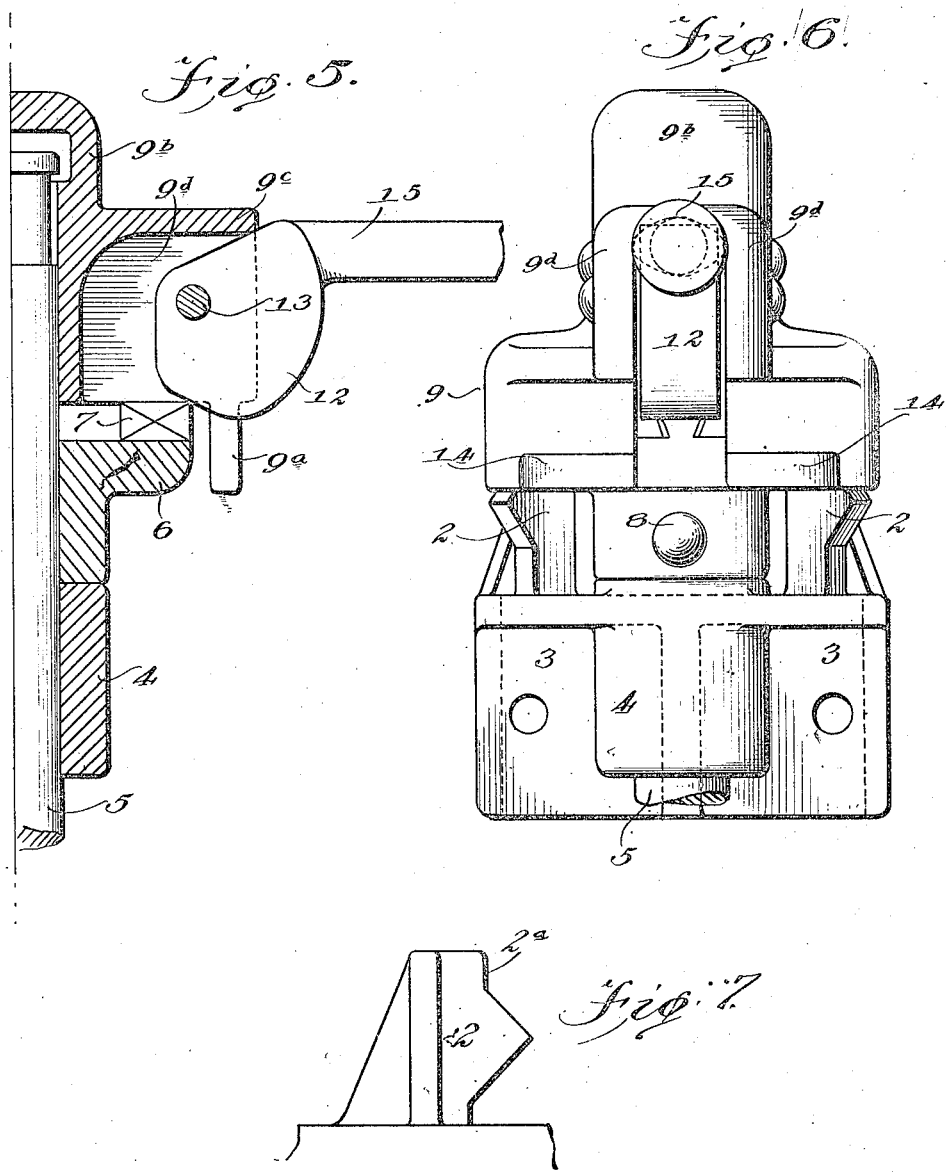

1,448,225

UNITED STATES PATENT OFFICE.

FRED C. McKNIGHT AND AUSTIN A. McKNIGHT, OF SHARPSVILLE, PENNSYLVANIA.

CAR BRAKE.

Application filed January 4, 1921. Serial No. 435,036.

*To all whom it may concern:*

Be it known that we, FRED C. MCKNIGHT and AUSTIN A. MCKNIGHT, citizens of the United States, residing at Sharpsville, in the county of Mercer and State of Pennsylvania, have invented certain new and useful Improvements in Car Brakes, of which the following is a specification.

Our invention relates to car brakes and has reference more particularly to improvements used in operating and releasing brakes, as applied to freight, passenger and other cars, which are operated by hand or power, and which may be manipulated from any position of such cars.

Our invention has for an object to provide means for operating, releasing and reversing the brake shaft of existing brake mechanism in either direction.

Another object is to provide in such a mechanism undercut teeth or dog clutches on a member fixed to the brake shaft to mesh with similar teeth on a sleeve movable on the brake shaft which has a foldable operating lever or handle.

Another object is to provide such an operating lever with cam projection through which the fixed and movable clutch members may be moved in and out of mesh.

A further object is to provide dead stops on a bracket supporting the brake shaft, providing such stops with means to cause the movable clutch member to move out of mesh with the stationary clutch member when the lever is swung in either direction.

These and other objects we attain by the mechanism illustrated in the accompanying drawings in which Figure 1 is a side elevation of the improvements, Figure 2 is a vertical section showing operating lever to active position, Figure 3 is a plan view showing the lever in idle position, Figure 4 is a development view of the undercut teeth or dog clutches on fixed and movable members of the clutch.

Figure 5 is a vertical section showing the lever in operating position,

Figure 6 is a front elevation showing operating lever in working position,

Figure 7 is a view of the dead stop and the sleeve elevating bevel.

In the preferred embodiment of the invention a supporting bracket 1 is used, said bracket provided with the side flanges 3 by which it is secured to the end of the car.

Extending upwardly from this bracket are the rigid dead stops 2 which face forwardly in opposite oblique direction at opposite sides of the bracket.

The forward end of the bracket is provided wth the hub or bearing 4 for the brake shaft 5 which is of the conventional type and carries the usual ratchet (not shown) which is controlled by the usual pawl, (also not shown) which is controlled by the foot of the operator.

Upon this bearing 4 is mounted a sleeve 6 which has a reduced collar which is rigidly connected with the brake shaft 5 by means of a rivet or bolt 8, so that the said sleeve rotates with the shaft.

The upper face of sleeve 6 is provided with undercut and inwardly tapered teeth or dog clutches 7 such teeth being integral with the sleeve 6.

Mounted on the shaft 5 and above the fixed sleeve 6 is a slidable sleeve 9 having a skirt portion $9^a$ which overhangs and surrounds the fixed sleeve throughout the greater part of its circumference. This sleeve 9 further includes a hollow dome portion $9^b$ which is of reduced diameter and fits over the upper end of shaft 5 and is held slidably thereon by a transverse pin 11 which passes tangentially through an annular groove adjacent the upper end of said shaft 5, the width of the groove being such as to permit the necessary movement of the sleeve. Within the skirt portion of the sleeve 9 the lower edge of same is provided with undercut and inwardly tapered teeth or dog clutches 10 which begin at the front at each side of the median line and continue around the same as indicated in Figures 1 and 4, that is, a slot is provided at the front of the sleeve 9 and enclosing the slot is the housing $9^c$ which comprises the apertured side ears $9^d$ between which the operating lever 15 is pivotally held by the rivet or pin 13.

The operating lever 15 has a cam shaped projection 12 substantially as shown, and is designed to hold sliding sleeve 9 out of mesh with sleeve 6 when moved slightly from the horizontal or operative position, but will permit sliding sleeve 9 and the relatively fixed sleeve 6 to mesh when said lever is in horizontal position.

The sliding sleeve is further provided at the front and at each side of the lever housing on the skirt portion with the laterally projecting lugs or stops 14, the rear faces of which are obliquely disposed to correspond to the faces of the abutments 2ª at the upper ends of the dead stops 2, and with which they are designed to contact to prevent the lever handle and the sliding sleeve being swung too far in either direction when the sleeve 9 is raised and out of mesh with sleeve 6. The inclined or bevel below this abutment on dead stops 2 causes the stop 14 to ride up and this lifts the sleeve 9 so that the stops 14 will be brought into horizontal alignment with said abutments and thus rendered positive in their action.

The skirt portion of the slidable sleeve 9 is of such external diameter that it is just free to rotate within the angular space defined by the obliquely positioned dead stops 2, but, should a sudden and violent blow be administered to the assembly from the front or from either side, these dead stops perform the additional function of a buffer and prevent the brake shaft 5 being bent.

To rotate or oscillate the brake shaft 5, the parts being as shown in Figure 1, the lever or handle 15 is raised to a horizontal position; this permits the sleeve 9 to descend by its own weight on the sleeve 6, the teeth 10 and 7 meshing so that the two clutch sleeves are positively coupled. The handle 15 can now be swung to either side and the brake shaft will be rotated the amount of rotation being governed by the amplitude of sweep of the handle in a horizontal plane. If the handle is swung around far enough the stop 14 engages the bevel or incline on the obliquely set dead stop and riding up the incline lifts the teeth 10 of the sleeve 9 out of mesh with teeth 7 on the sleeve 6 and thus leave the sleeve 9 free to rotate on the upper end of the shaft 5, this being permitted by the pin 11 sliding around the shaft within the annular groove near the upper end of the shaft. Complete rotation of the sleeve 9 is prevented by the stops 14 engaging the upstanding lug at the upper end of the incline, the contacting face of these lugs being set at an angle corresponding to that of the rear faces of the stops 14.

The upper sleeve may also be raised out of interlocked relation with the sleeve 6 by folding the handle downwardly to a vertical position, the cam 12 riding on the teeth 7 of sleeve 6 and thereby causing the sleeve 9 to rise, the cross pin 11 sliding upwardly in the annular groove of shaft 5.

Having thus described our invention, what we claim is:

1. In a brake operating device the combination with a brake staff, of a bracket having a bearing hub through which said staff extends, obliquely disposed vertical dead stops upon said bracket and at the rear portion thereof, a face ratchet fixed to said staff and supported on said bracket hub, a sleeve rotatably and longitudinally slidably engaged on the staff and provided on its lower face with ratchet teeth arranged to make positive engagement with the fixed ratchet, said sleeve having an annular skirt overhanging the fixed ratchet, a housing carried at the front of the said sleeve, a folding handle or lever pivotally mounted at one end in said housing and provided with a cam for engaging the fixed ratchet to lift the slidable sleeve when the lever is swung downwardly from a horizontal to a vertical position to cause disengagement of the ratchet teeth, and means for limiting movement of the slidable sleeve, said means including a transverse pin passing through the sleeve and tangentially through an annular groove adjacent the upper end of the staff.

2. A car brake mechanism comprising in combination a bracket rigidly secured to the car body, a bearing hub at the front end of said bracket, oppositely obliquely disposed dead stops extending upwardly from said bracket at its rear portion, said dead stops defining an angular buffer, a brake staff, a face ratchet fixed on said staff, a face ratchet rotatably engaged on said staff and movable longitudinally on said staff into and out of engagement with the fixed ratchet, a handle pivotally connected to said movable ratchet for turning the same and movable with said ratchet, the movable ratchet member having an annular skirt portion overhanging the relatively fixed ratchet and extending within the aforesaid angular buffer, the dead stops having inclined portions and the front face of said dead stops being disposed diagonally and lateral stops projecting rearwardly from the front portion of the skirt, the rear face of said stops diagonally disposed to correspond with the diagonal front faces of the dead stops.

3. Hand actuated car brake mechanism comprising in combination a brake staff, a rigid bracket having a hub bearing for said staff and adapted for attachment to a part of a car, said hub adapted to support a clutch member rigidly mounted on said staff, said clutch member provided with undercut and inwardly tapered teeth on its upper face, a sleeve having a hollow dome portion rotatably and slidably engaged on said staff, undercut and inwardly tapered teeth projecting from the lower face of the sleeve and forming the other clutch member, an annular skirt extending from said sleeve and enclosing said last named teeth and overhanging the teeth of the first mentioned clutch member, a housing at the front of the movable sleeve, a handle pivotally supported in said housing and having a cam portion adapted to engage and rest on the teeth of the first named clutch member when said handle is swung downwardly from a horizontal to a vertical position, and hold the clutch teeth out of mesh and the mechanism in inoperative position.

4. In a brake operating device the combination with a brake staff, of a bracket having a bearing hub through which said staff extends, vertical dead stops upon said bracket and at the rear portion thereof, a clutch member fixed to said staff and supported on said hub, said clutch member having undercut teeth on its upper face, a sleeve rotatably and slidably engaged on said staff and provided on its lower face with undercut teeth adapted to make positive engagement with the said clutch member, a housing carried at the front of said sleeve, a lever pivotally mounted at one end in said housing and provided with a cam for engaging the fixed clutch member to lift the slidable sleeve when the lever is swung from a horizontal to a vertical position and cause disengagement of the clutch teeth, and means for connecting the sleeve to the staff and which will permit rotary and longitudinal slidable movement of said sleeve on the staff.

FRED C. McKNIGHT.
AUSTIN A. McKNIGHT.